United States Patent
Nishimura et al.

(10) Patent No.: US 11,236,226 B2
(45) Date of Patent: Feb. 1, 2022

(54) MELT PROCESSIBLE FLUORORESIN COMPOSITION AND INJECTION MOLDED ARTICLE FORMED FROM SAME

(71) Applicant: CHEMOURS-MITSUI FLUOROPRODUCTS CO., LTD., Tokyo (JP)

(72) Inventors: Takahiro Nishimura, Shizuoka (JP); Toshiki Kitagawa, Shizuoka (JP)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 16/431,030

(22) Filed: Jun. 4, 2019

(65) Prior Publication Data
US 2019/0375929 A1    Dec. 12, 2019

(30) Foreign Application Priority Data
Jun. 7, 2018  (JP) .............................. JP2018-109634

(51) Int. Cl.
| C08L 27/18 | (2006.01) |
| B29C 45/00 | (2006.01) |
| B29K 27/18 | (2006.01) |

(52) U.S. Cl.
CPC .......... *C08L 27/18* (2013.01); *B29C 45/0001* (2013.01); *B29C 45/0025* (2013.01); *B29K 2027/18* (2013.01); *B29K 2995/0077* (2013.01); *C08L 2201/08* (2013.01); *C08L 2205/025* (2013.01); *C08L 2205/03* (2013.01)

(58) Field of Classification Search
CPC ...... C08L 27/18; C08L 27/22; C08L 2201/08; C08L 2205/03; C08L 2205/025; B29C 45/0001; B29C 45/0025; B29K 2995/0077; B29K 2027/18
See application file for complete search history.

(56) References Cited

U.S. PATENT DOCUMENTS

| 3,635,926 A | 1/1972 | Gresham et al. |
| 4,380,618 A | 4/1983 | Khan et al. |
| 4,743,658 A | 5/1988 | Imbalzano et al. |
| 6,426,386 B2 | 7/2002 | Lee et al. |
| 7,932,333 B2 | 4/2011 | Brothers et al. |
| 2004/0116606 A1 | 6/2004 | Sumi |
| 2004/0254300 A1 | 12/2004 | Namimatsu |
| 2008/0283271 A1 | 11/2008 | Kenny |
| 2010/0288533 A1 | 11/2010 | Burch |
| 2014/0287177 A1 | 9/2014 | Suda |

FOREIGN PATENT DOCUMENTS

| JP | 2003-213196 A | 7/2003 |
| JP | 2003-231722 A | 8/2003 |
| JP | 3550891 B2 | 5/2004 |
| JP | 4228917 B2 | 12/2008 |
| JP | 4289877 B2 | 4/2009 |
| JP | 4792622 B2 | 8/2011 |
| JP | 2015-096572 A | 5/2015 |
| JP | 2017-119741 A | 7/2017 |
| WO | 9941313 | 8/1999 |
| WO | 2013/119613 A1 | 8/2013 |

OTHER PUBLICATIONS

International Search Report and Written Opinion in PCT/US2019/033431 dated Aug. 19, 2019, 10 pages.

*Primary Examiner* — Irina S Zemel

(57) ABSTRACT

Provided is a melt processible fluororesin composition for injection molding of articles that has melt flow that facilitates injection molding, that can enhance strength of a fluororesin weld line area in an injection molded article, and that achieves excellent release from a mold. The fluororesin composition includes two or more types of melt processible fluororesins having different melt flow rates; one of the melt processible fluororesins being a high melt flow rate melt processible fluororesin having a melt flow rate of 35 g/10 min or greater, and another being a low melt flow rate melt processible fluororesin having a melt flow rate of 10 g/10 min or greater but less than 35 g/10 min; and wherein the ratio of the melt flow rate (MFRa) of the high MFR melt processible fluororesin to the melt flow rate (MFRb) of the low MFR melt processible fluororesin (MFRa/MFRb) is from 1 to 10.

12 Claims, 5 Drawing Sheets

MELT PROCESSIBLE FLUORORESIN COMPOSITION AND INJECTION MOLDED ARTICLE FORMED FROM SAME

CROSS-REFERENCE TO RELATED APPLICATIONS

This application claims the benefit of Japanese Patent Application No. JP 2018-109,634 filed Jun. 7, 2018, which is incorporated by reference herein in its entirety.

TECHNICAL FIELD

The present invention relates to a melt processible fluororesin composition that can enhance the strength of a fluororesin weld line area in an injection molded fluororesin article, and an injection molded fluororesin article which is formed from this melt processible fluororesin composition in which the strength of a weld line area has been enhanced.

BACKGROUND TECHNOLOGY

Fluororesins have excellent heat resistance, chemical resistance, electrical properties, and mechanical properties, and have significantly low coefficients of friction, non-adhesiveness, and water and oil repellency. Fluororesins are therefore widely used in various types of industrial fields, such as chemical, mechanical, and electrical machinery industries.

In particular, because melt processible fluororesins exhibit melt flow at temperatures above their melting point, melt processible fluororesins have been molded to form various parts, such as tubes, sheets, and joints, by known melt molding methods in the art (e.g. melt extrusion molding, melt injection molding, blow molding, transfer molding, melt compression molding, and the like), in addition to being used as raw materials for coating materials for fluororesin coatings. These parts formed from such melt processible fluororesins are used for various purposes, such as pipes, joints, or chemical storage containers for chemical transportation in semiconductor production process and/or chemical plants, and lining of pipes and tanks.

Among these melt molding methods, melt injection molding has been used as a molding method to produce molded articles having complex shapes, such as joints, in a high yield by using a melt processible fluororesin.

For example, Patent Document 1 below describes a molding material comprising a copolymer (A) and having a melt flow rate of 14.8 to 50 g/10 min, the copolymer (A) being a copolymer formed from tetrafluoroethylene and perfluorovinyl ether, and the molding material containing 4 mass % or greater of perfluoro(alkyl vinyl ether) units, having a melting point of 295° C. or higher, and having not greater than 50 unstable terminal groups per $10^6$ carbon atoms in the copolymer (A), and describes that an injection molded article having excellent ozone resistance can be obtained by this molding material.

Furthermore, Patent Document 2 below describes a tetrafluoroethylene/perfluoro(alkyl vinyl ether) copolymer comprising polymerized units (A) based on tetrafluoroethylene and polymerized units (B) based on a perfluoro(alkyl vinyl ether), the molar ratio of (A)/(B) being in a range from 98.1/1.9 to 95.0/5.0, and a melt flow rate at 372° C. being in a range from 35 to 60 g/10 min, and $M_w/M_n$ ($M_w$ represents a weight average molecular weight, and $M_n$ represents a number average molecular weight) being in a range from 1 to 1.7, and describes that this tetrafluoroethylene/perfluoro(alkyl vinyl ether) copolymer achieves excellent mechanical properties and injection molding properties.

In injection molded articles formed from melt processible fluororesins having a complex shape such as a joint, a boundary line called a "weld line" is formed in a region where separate flows of molten resins merge and come into contact together in a mold. It is known that the strength of the region where such a weld line is formed is lower than other regions in an injection molded article. In some cases, the shape of a mold or the like is devised to avoid the formation of a weld line. However, depending on the shape of an injection molded article to be produced, there are many cases where formation of a weld line in the article cannot be avoided.

In recent years, to enhance the yield of semiconductor production, flow rate and temperature of liquid chemicals tend to be increased, and along with this, pressure applied to an inner surface of a pipe or joint transporting the chemicals is increased, and thus increased strength for tolerating the applied pressure has been demanded for pipes and the like. Therefore, it has been demanded to enhance strength and durability of weld line areas, for joint parts and the like produced by injection molding. Furthermore, solvent resistance, by which deterioration is caused by solvents that are passed therethrough for a long period of time, has been also demanded.

It is proposed to enhance the strength of a weld line area of an injection molded article of such a melt processible fluororesin.

For example, Patent Document 3 below describes articles that can be obtained by injection-molding thermoprocessable copolymers of tetrafluoroethylene (TFE) and the following monomers in the indicated amounts: A) (a) from 8.6 to 9.8 wt. % of perfluoromethylvinylether (FMVE); (b) from 0.3 to 1.2 wt. % of a perfluorodioxole (however, the sum of the weight percentages of (a)+(b) is from 8.9 to 11 wt. %) or B) (a) from 4.5 to 8.5 wt. % of perfluoromethylvinylether (FMVE); (b) from 1.7 to 7.5 wt. % of a perfluorodioxole as defined in A) (however, the sum of the weight percentages of (a)+(b) is from 6.2 to 11 wt. %); the complement to 100 wt. % in compositions A) and B) being TFE; wherein the manufactured articles show the following mechanical properties: elongation at break ≥130% measured at 23° C. along the weld lines of the injection molded articles; stress at break ≥2.5 MPa and elongation at break ≥250%, measured at 250° C. on compression molded plaque; and describes that, in this article, suitable mechanical resistance can be ensured on the weld line.

Furthermore, Patent Document 4 below describes that, in a method of producing a fluorine-containing copolymer molded article comprising: a step (I) of obtaining a premolded article by molding a melt-moldable fluorine-containing copolymer (A) that has a carbonyl group-containing group in at least one of a main chain or a main chain terminal and that has a melting point of 255° C. or higher, and a step (II) of obtaining a molded article by subjecting the premolded article to heat treatment, the heat treatment is performed in a manner that a ratio of MFR (II) to MFR (I) (MFR(II)/MFR(I)) becomes from 0.05 to 0.5 in the step (II) when a melt flow rate of the premolded article is MFR (I) and a melt flow rate of the fluorine-containing copolymer article is MFR (II) at a temperature that is 250° C. or higher and that is at least 5° C. lower than the melting point of the fluorine-containing copolymer (A), and describes that, by this, a premolded article having no weld line can be produced.

PATENT DOCUMENTS

Patent Documents

Patent Document 1: JP 4228917 B
Patent Document 2: JP 4792622 B
Patent Document 3: JP 4289877 B
Patent Document 4: JP 2015-96572 A

SUMMARY OF THE INVENTION

Problem to be Resolved by the Invention

However, Patent Document 3 above does not fully satisfy economical efficiency because the perfluorodioxole, which is added to improve mechanical resistance of a weld line area of an injection molded article of FMVE, is expensive, and it is desirable to enhance strength and solvent resistance of weld line areas of general purpose injection molded articles.

Furthermore, while Patent Document 4 above avoids occurrence of a weld line in a product having a relatively simple shape, such as an electric wire, formed by extrusion molding, its methodology is difficult to apply in a product in which occurrence of a weld line cannot be avoided, such as a joint. Furthermore, because wear resistance is enhanced by increasing the storage modulus of the fluorine-containing copolymer molded article by forming a crosslinked structure in the molecule by subjecting a premolded article to heat treatment, as a result there are many molding steps, and so not fully satisfactory in terms of productivity.

Therefore, an object of the present invention is to provide a melt processable fluororesin composition for injection molding that achieves excellent melt flow of the resin in injection molding, that can enhance strength of a fluororesin weld line area in an injection molded fluororesin article, is durable against chemicals and solvents, and that achieves excellent release from a mold.

Another object of the present invention is to provide an injection molded fluororesin article that has enhanced strength of a fluororesin weld line area.

Means for Resolving Problems

According to the present invention, provided is a melt processable fluororesin composition including: two or more types of melt processable fluororesins having different melt flow rates; one of the two or more types of melt processable fluororesins being a high melt flow rate (MFR) melt processible fluororesin having a melt flow rate of 35 g/10 min or greater, and another being a low melt flow rate melt processible fluororesin having a melt flow rate of 10 g/10 min or greater but less than 35 g/10 min; and a ratio of the melt flow rate (MFRa) of the high MFR melt processible fluororesin to the melt flow rate (MFRb) of the low MFR melt processible fluororesin (MFRa/MFRb) being greater than 1 but less than or equal to 10.

The melt processable fluororesin composition of the present invention has a number of embodiments, including:
1. in one embodiment the melt flow rate of the melt processable fluororesin composition is in a range from 10 to 100 g/10 min.
2. in one embodiment the content of the high MFR melt processable fluororesin in the melt processable fluororesin composition is from 5 to 95 wt. % of the total amount of the melt processable fluororesins.
3. in one embodiment the high and low MFR melt processible fluororesins of the melt processable fluororesin composition are each tetrafluoroethylene/perfluoro(alkyl vinyl ether) copolymers (PFA).
4. in one embodiment the melt processable fluororesin composition further comprises from 0.01 to 1 wt. % of a high molecular weight polytetrafluoroethylene (PTFE).
5. in one embodiment the high MFR melt processible fluororesin and the low MFR melt processible fluororesin of the melt processable fluororesin composition are both tetrafluoroethylene/perfluoro(alkyl vinyl ether) copolymers (PFA), and the content of perfluoro(alkyl vinyl ether) in the high MFR melt processible fluororesin is from 1.5 to 5.0 mol %, and the content of perfluoro(alkyl vinyl ether) in the low MFR melt processible fluororesin is from 1.0 to 4.0 mol %.
6. In one embodiment a present melt processable fluororesin composition is injection molded under conditions of injection pressure and holding pressure of 50 MPa to form a sheet from which is cut a micro dumbbell-shaped test piece (in accordance with ASTM D-2116, "Tensile Properties") having a thickness of 1.9±0.5 mm and including a fluororesin weld line. The test piece is subjected to tensile fatigue test performed under conditions: distance between supports of 22 mm, tensile test speed of 200 mm/min, temperature 23° C., sinusoidal wave, and stress ratio of 0.1. A stress life (S-N) plot (plotting nominal stress amplitude (MPa) versus cycle number (stress at break) in log scale) is created for the test results wherein the stress amplitude (MPa) is plotted on the Y-axis and cycle number is plotted on the X-axis. The logarithmic equation $Y=a*\ln(X)+b$ is fitted by the least squares method to the data comprising the S-N plot. For the melt processable fluororesin compositions of the present invention subjected to this test, it is found from such a plot that for X of at least 1,000 cycles, a Y value of greater than 14.5 MPa and the value of the slope (i.e., "a") of greater than −0.15 are obtained.

Also provided is an injection molded article formed by subjecting the present melt processable fluororesin composition to injection molding.

Effect of the Invention

In a fluororesin article formed by injection molding of a fluororesin, the article having a complex shape such as a joint that cannot avoid formation of a fluororesin weld line, the strength of the formed fluororesin weld line area can be significantly enhanced by use of a melt processable fluororesin composition of the present invention.

Furthermore, because the present melt processable fluororesin composition has a melt flow rate (hereinafter, also referred to as "MFR") in a range from 10 to 100 g/10 min and has excellent melt flow, excellent injection molding performance is achieved. Furthermore, in one embodiment the present melt processable fluororesin composition further comprises high molecular weight PTFE, and in this embodiment excellent release of the injection molded article from a mold is achieved.

Furthermore, in the injection molded article formed by subjecting the present melt processable fluororesin composition to injection molding, the strength of a weld line area is significantly enhanced, and excellent durability and solvent resistance of the injection molded article are achieved.

DESCRIPTION OF THE PREFERRED EMBODIMENTS

Melt Processable Fluororesin Composition

Figure 1:
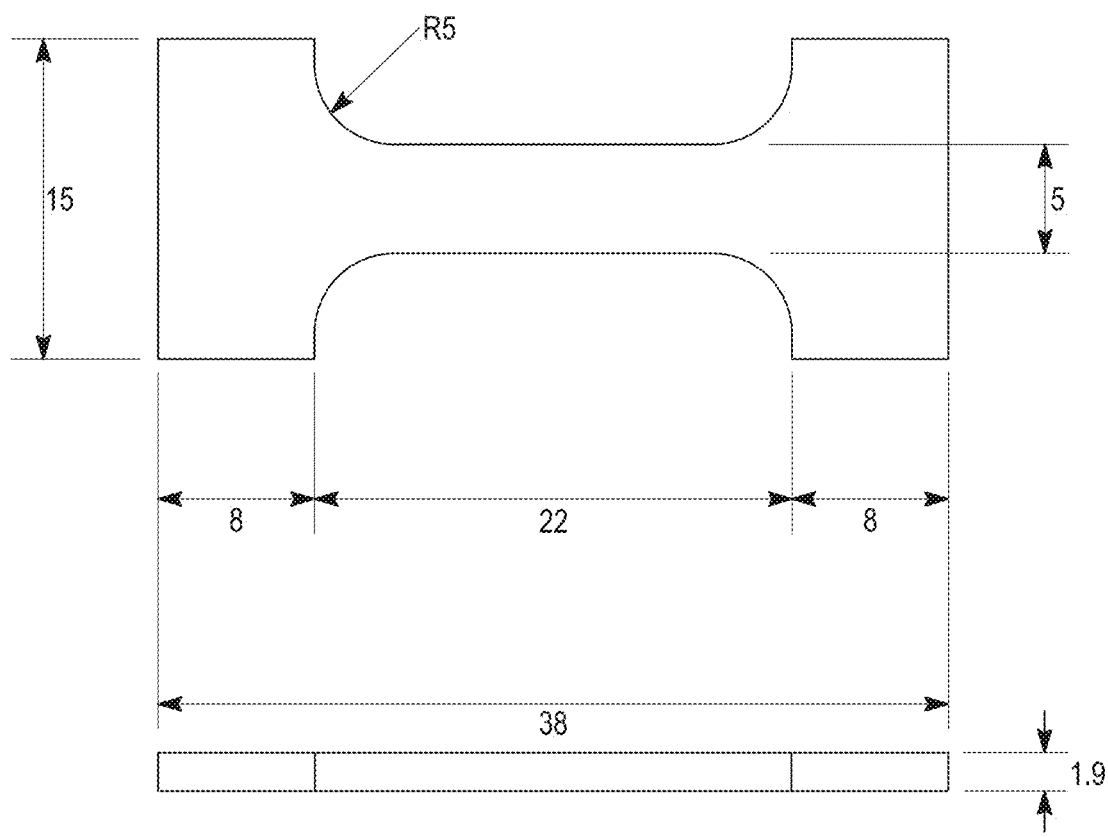
FIG. 1 is a drawing of the test piece used in tensile fatigue test.

The high MFR melt processable fluororesin used in the present melt processable fluororesin composition has an MFR of 35 g/10 min or greater, preferably 40 g/10 min or greater, more preferably 50 g/10 min, and particularly preferably 60 g/10 min or greater. Without wishing to be bound by theory, because the high MFR melt processable fluororesin has relatively low molecular weight and high melt flow, blending of the high MFR melt processable fluororesin facilitates formation of entanglements of molecular chains in a fluororesin weld line area which results in enhanced strength and durability of the weld line area.

The MFR of the high MFR melt processable fluororesin used in the present melt processable fluororesin composition is at least 35 g/10 min or greater, and the upper limit is not particularly limited, from the perspective of enhancing strength of the fluororesin weld line area. However, when the MFR is too high, entanglement of the molecular chains throughout the bulk of the molded article are decreased, and although the strength of the weld line may be sufficient, the strength throughout the whole molded article becomes insufficient, and solvent resistance is deteriorated and solvents easily permeate therethrough and may cause cracks. Therefore, the MFR of the high MFR melt processable fluororesin is preferably 150 g/10 min or less, and more preferably 100 g/10 min or less. Thus, in one embodiment the MFR of the high MFR melt processable fluororesin is from 35 g/10 min to 150 g/10 min. In another embodiment the MFR of the high MFR melt processable fluororesin is from 35 g/10 min to 100 g/10 min.

The MFR of the low MFR melt processable fluororesin used in the present melt processable fluororesin composition is 10 g/10 min or greater but less than 35 g/10 min. In one embodiment the MFR of the low MFR melt processable fluororesin is in the range of from 12 to 32 g/10 min. The presence of the low MFR melt processable fluororesin in the present melt processable fluororesin composition enhances the strength throughout the whole molded article and increases solvent resistance. When the MFR of the low MFR melt processable fluororesin is less than the range described above, melt flow of the resin composition decreases, injection molding performance is deteriorated, and layer separation occurs during the molding, and as a result, delamination and surface roughness may occur in the injection molded article surface. On the other hand, when the MFR is greater than the range described above, reduction in the strength throughout the whole molded article and the solvent resistance may not be enhanced.

In one embodiment of the present melt processable fluororesin composition, the ratio of the MFR of the high MFR melt processable fluororesin (MFRa) to the MFR of the low MFR melt processable fluororesin (MFRb) (MFRa/MFRb) is from 1 to 10 or less, and, in particular, in a range from 2 to 8. When the MFRa/MFRb is greater than the range described above, injection molding properties are deteriorated, and layer separation occurs during the molding, and as a result, delamination and surface roughness may occur at the injection molded article surface.

In one embodiment of the present melt processable fluororesin composition, the MFR of the melt processable fluororesin composition is from 10 to 100 g/10 min, preferably from 15 to 80 g/10 min, and more preferably from 20 to 60 g/10 min. When the MFR of the melt processable fluororesin composition is less than the range described above, the melt flow of the composition may be insufficient, and a molded article having a complex shape may not be molded. On the other hand, when the MFR is greater than the range described above, the mechanical strength throughout the whole molded article may decrease compared to the case where the MFR is in the range described above. Furthermore, draw-down (stretching like a string) occurs during the injection molding, and adjustment of the injection molding conditions may be difficult.

In the present specification, the melt flow rate (MFR) of the melt processable fluororesin is measured in accordance with ASTM D-1238, and the melting temperature and the extrusion load during measurement are in accordance with ASTM D-1238. When the melt processable fluororesin is PFA or FEP, the MFR measurement temperature is 372 ($\pm$1)° C., and the applied load is 5 kg. Specific measurement methods are described below.

Furthermore, when the high MFR melt processable fluororesin and/or the low MFR melt processable fluororesin are formed from a plurality of melt processable fluororesins having MFRs that are different from each other, an average value of the MFRs of the high MFR melt processable fluororesins is calculated based on each of the MFRs of the plurality of melt processable fluororesins having MFRs of 35 g/10 min or greater and the compounded proportions thereof, and this average value is used as the MFR of the high MFR melt processable fluororesins. Similarly, an average value of the MFRs of the low MFR melt processable fluororesins is calculated based on each of the MFRs of the plurality of melt processable fluororesins having MFRs of 1 g/10 min or greater but less than 35 g/10 min and the compounded proportions thereof, and this average value is used as the MFR of the low MFR melt processable fluororesins.

In one embodiment of the present melt processable fluororesin composition, the high MFR melt processable fluororesin and the low MFR melt processable fluororesin are contained in a weight ratio of from 5:95 to 95:5, preferably in a range from 10:90 to 90:10, and more preferably in a range from 15:85 to 85:15. When the amount of the high MFR melt processable fluororesin is less than the range described above, it is believed that the molecular chains entanglement effect in a weld line area of an injection molded fluororesin article is reduced compared to the case where the amount is in the range described above, and enhancement of the strength of the weld line area may not be possible. On the other hand, when the amount of the high MFR melt processable fluororesin is greater than the range described above, due to the increase of low molecular weight components, the strength throughout the whole molded article decreases and the solvent resistance may also decrease compared to the case where the amount is in the range described above.

Melt Processible Fluororesin

The high and low MFR melt processible fluororesins comprising the present melt processible fluororesin composition are fluororesins exhibiting melt flow when subjected to temperatures at or above the given fluororesin melting point.

Examples thereof include low molecular weight polytetrafluoroethylenes (PTFE), tetrafluoroethylene/perfluoro(alkyl vinyl ether) copolymers (PFA), tetrafluoroethylene/hexafluoropropylene copolymers (FEP), tetrafluoroethylene/hexafluoropropylene/perfluoro(alkyl vinyl ether) copolymers, tetrafluoroethylene/ethylene copolymers, polyvinylidene fluorides, polychlorotrifluoroethylenes, chlorotrifluoroethylene/ethylene copolymers, and the like.

In the case of use in molding of an injection molded article, especially a pipe or a joint for chemical handling, melt processible perfluororesins, such as PTFE (low molecular weight variety (also known in this field as PTFE micropowder)), PFA, FEP, and tetrafluoroethylene/hexafluoropropylene/perfluoro(alkyl vinyl ether) copolymers, are preferably used among the melt processible fluororesins described above, from the perspective of excellent chemical resistance. Among these, PFA is most preferable from the perspectives of excellent heat resistance and moldability.

Because enhancement of the melt flow of the resin is desirable to achieve excellent injection molding performance, the melt processible fluororesin preferably contains a large amount of comonomer. That is, when the molecular weight of the resin is too small to enhance the melt flow of the melt processible fluororesin composition, reduction in the strength of the injection molded article may occur. However, by allowing a large amount of comonomer to be contained, the melting point can be lowered and the melt flow can be enhanced without reducing the molecular weight of the resin. Furthermore, by blending a large amount of comonomer, entanglement of molecular chains is promoted in the molten state in the fluororesin injection molded article weld line area, and the strength of the weld line area is enhanced.

For example, when PFA is used in the high MFR melt processible fluororesin, the content of repeating units in the PFA arising from perfluoro(alkyl vinyl ether) (PAVE) comonomer is 1.5 mol % or greater, preferably 1.7 mol % or greater, and more preferably in a range from 1.9 to 5.0 mol %. On the other hand, in the low MFR melt processible fluororesin, the content of repeating units in the PFA arising from perfluoro(alkyl vinyl ether) (PAVE) comonomer is 1.0 mol % or greater, preferably 1.2 mol % or greater, and more preferably in a range from 1.4 to 4.0 mol %.

In one embodiment, the perfluoro(alkyl vinyl ether) (PAVE) comonomer of the PFA has a perfluoroalkyl group having from 1 to 5 carbons. In one embodiment, perfluoro(ethyl vinyl ether) (PEVE) having 2 carbons and perfluoro(propyl vinyl ether) (PPVE) having 3 carbons are preferred as PAVE. When the number of carbons of the alkyl group is large, it becomes difficult to incorporate a sufficient amount of PAVE repeating units into the PFA.

Synthesis of Melt Processible Fluororesin

As the high MFR melt processible fluororesin and the low MFR melt processible fluororesin constitutents of the present melt processible fluororesin composition, commercially available products and/or those produced by conventionally known methods can be used as long as each melt processible fluororesin has the MFR described above.

For example, in the case of PFA (TFE/PAVE copolymer), although no such limitation is intended, synthesis can be performed by the methods described in JP 2017-119741 A, JP 3550891 B, JP 4392706 B, and the like. In particular, polymerization by dispersion polymerization in a liquid is preferable, and water-based emulsion polymerization in which water is used as a liquid medium is preferable from the perspective of the environment. To provide a copolymer having uniform composition, a fluorine-containing solvent may be used together with water.

The water-based emulsion polymerization can be performed at a temperature in a wide range; however, from the perspectives of problems of heat transfer and use of an initiator that is activated by heat, a temperature in a range from approximately 50 to 110° C. is advantageous, and a temperature in a range from 70 to 90° C. is preferable. The surfactant used in the emulsion polymerization tends to lose dispersion stability when excessive heating is performed.

An appropriate surfactant can be used in the water-based emulsion polymerization of the PFA. Specifically, ammonium perfluorooctanoate (C-8), ammonium perfluorononanoate (C-9), perfluoroalkylethane sulfonic acid and salts thereof described in U.S. Pat. No. 4,380,618 B, and fluoropolyether acid and salt surfactant described in JP 2010-509441 A are preferably used.

As the initiator of the water-based emulsion polymerization, a water-soluble free radical initiator, such as ammonium persulfate (APS), potassium persulfate (KPS), or disuccinic acid peroxide, or a redox initiator, such as an initiator based on potassium permanganate, can be used.

In the water-based emulsion polymerization of the PFA, a chain transfer agent (CTA) can be used. A wide variety of compounds can be used as the CTA. For example, a hydrogen-containing compound, such as a molecular hydrogen, a lower alkane, or a lower alkane substituted with a halogen atom, is used. The CTA can form a relatively stable terminal group depending on the structure of the CTA. Examples of the preferable CTA include methane, ethane, and substituted hydrocarbons, such as methyl chloride, methylene chloride, chloroform, and carbon tetrachloride. The amount of the CTA used to achieve a desired molecular weight in a particular polymerization condition depends on the amount of the used initiator and the chain transfer efficiency of the selected CTA. The chain transfer efficiency is changed considerably depending on the compound, and also changed depending on the temperature.

As disclosed in U.S. Pat. No. 3,635,926 B, a more stable amide terminal group can be provided by adding a basic buffer agent, such as ammonium carbonate or ammonia (ammonium hydroxide).

In a reaction vessel, water and surfactant and, as necessary, CTA and a comonomer, are charged and heated to a selected temperature. After agitation is started, a solution of initiator is added at a specified rate to initiate the polymerization. A pressure drop is an indicator indicating the start of the polymerization. Thereafter, addition of TFE is started, and to adjust the polymerization, addition (injection) of TFE and pressure are controlled. Typically, an initiator solution that may be the same or different from the first initiator solution is added throughout the reaction. Addition of a PAVE comonomer may be performed by charging the PAVE comonomer in advance in the reaction vessel or may be injected and added similarly to the case of TFE after the initiation of the polymerization. The rate of the PAVE addition may be fixed or not fixed (variable).

In addition, the polymerization can be controlled by agitation speed and pressure in the reaction vessel. A high pressure increases the reaction rate, and a high reaction rate increases heat build-up because the polymerization of the TFE is exothermic. It is thus necessary to consider heat removal. The applied pressure is decided based on the design of the device and the safety problem of handling the TFE, and typically, the pressure in a range from approximately 0.3 to 7 MPa is known for the water-based emulsion polymerization of the TFE copolymer, and the pressure in a range from 0.7 to 3.5 MPa is more typical. Typically, a constant pressure is maintained in the reaction vessel; however, the pressure may be varied.

Fluorination

When the high and low MFR melt processable fluororesins constituting the present melt processable fluororesin composition are melt processable perfluororesins, it is possible to further enhance the heat resistance, oil resistance, chemical resistance, and surface non-adhesivity of the polymer and the molded article thereof by making the terminal endgroups of the polymer chains $-CF_3$ groups by treatment of the perfluororesin with a fluorinating agent, most commonly fluorine gas. This treatment is called "fluorination" by skilled practitioners in this field and can be performed in accordance with the method described in JP 62-104822 A and the like. In one embodiment, at least one of the high and low melt flow rate melt processable fluororesins are fluorinated to reduce the number of fluororesin chain unstable endgroups and replace such endgroups with $-CF_3$ endgroups. In another embodiment, each of the high and low melt flow rate melt processable fluororesins are fluorinated to reduce the number of fluororesin chain unstable endgroups and replace such endgroups with $-CF_3$ endgroups. In one embodiment, the melt processable fluororesin is fluorinated to contain less than 6 unstable endgroups (for example, unstable endgroups such as $-CH_2OH$, $-CONH_2$, $-COF$, and $-CO_2H$) per $10^6$ fluororesin carbon atoms.

Other Components

In one embodiment the present melt processable fluororesin composition contains from 0.01 to 1 wt. %, preferably from 0.05 to 0.5 wt. %, of a high molecular weight PTFE. By blending the high molecular weight PTFE in the range described above, entanglement of surface molecular chains of the injection molded article becomes firm, and release (removal) of an injection molded article from an injection molding mold is enhanced, and thus surface roughness is effectively prevented while layer separation of surface layers does not occur. Furthermore, by enhancing the entanglement of the molecular chains of a whole injection molded article, the strength of a whole molded article is enhanced, and enhancement of solvent resistance can be also expected.

In the present invention, by high molecular weight PTFE is meant high molecular weight PTFE that does not exhibit melt flow even at the melting point or higher and as a result, as a neat polymer, is not melt processable. In one embodiment, the high molecular weight PTFE has a melting heat of crystallization of less than 50 J/g, and preferably less than 40 J/g.

In one embodiment a variety of organic and/or inorganic fillers can be added to the present melt processable fluororesin composition, depending on the characteristics required thereof. Examples of organic fillers include engineering plastics, such as polyphenylene sulfides, polyether ether ketones, polyamides, and polyimides. Examples of inorganic fillers include metal powders, metal oxides (e.g., aluminum oxide, zinc oxide, tin oxide, titanium oxide, and the like), glass, ceramics, silicon carbides, silicon oxides, calcium fluorides, carbon black, graphites, micas, barium sulfates, and the like.

Fillers having a variety of shapes, such as particle shaped, fiber shaped, flake shaped fillers, and the like, can be used as the shape of the filler.

In addition, depending on the desired characteristics, such as electrical conductivity, foam prevention, and wear resistance enhancement, pigments and various additives that are used in typical fluororesin compositions and molded articles can be added.

Preparation of Melt Processable Fluororesin Composition

The present melt processable fluororesin composition can be prepared by mixing the high MFR melt processable fluororesin and the low MFR melt processable fluororesin described above by a publicly known mixing method.

Mixing methods of utility include: dry blending in which the high MFR melt processable fluororesin and the low MFR melt processable fluororesin are mixed in a form of dried pellets; wet mixing in which mixing is performed by using water or an organic solvent as a mixing medium; a method in which a fluororesin dispersion in a form of colloid is mixed while highly dispersed state is maintained (co-coagulation method); and a melt mixing method.

As the melt mixing method, it is preferable to perform mechanically kneading at a temperature that is not lower than the melting point of the high MFR melt processable fluororesin and the low MFR melt processable fluororesin. The melt mixing can be performed by, for example, using a high temperature kneader, a screw extruder, a twin-screw extruder, and the like. In a preferred embodiment, the high MFR melt processable fluororesin and the low MFR melt processable fluororesin are thoroughly mixed by a method such as dry blending or wet mixing before the melt mixing is carried out.

In one embodiment, the present melt processable fluororesin composition comprises particles of melt processable fluororesin having a core-shell structure, in which one of the high MFR melt processable fluororesin and the low MFR melt processable fluororesin becomes a core of a primary particle and the other becomes a shell. Such core-shell architecture particles can be obtained by methods known in the art, for example, by performing polymerization stepwise in the emulsion polymerization described above.

The form of the melt processable fluororesin used in the mixing is not limited; however, from the perspective of workability, examples thereof include dispersions of microparticles having an average particle size from 0.05 μm to 1 μm, powders of several micrometers to several tens of micrometers, and granules of powders of several hundreds of micrometers.

Examples of the form of the melt processable fluororesin composition of an embodiment of the present invention include powders, granules of powders, particles, flakes, pellets, and the like. The average particle size of the obtained composition is 0.1 μm or greater and is preferably in the range that does not impair handleability.

Injection Molded Article

In an embodiment of the present invention, an injection molded fluororesin article that has the significantly enhanced strength of a fluororesin weld line area is provided by subjecting the melt processable fluororesin composition described above to injection molding.

That is, in an embodiment of the present invention, as a result of focusing on the strength of a fluororesin weld line area formed inevitably in an injection molded article having a complex shape, to enhance the strength at this weld line, a melt processible fluororesin composition comprising: a high MFR melt processible fluororesin having a predetermined MFR that has a low molecular weight, that has a high melt flow, and that can enhance the strength of the weld line area of the injection molded article due to its tendency to form entangled molecular chains in the weld line area, and a low MFR melt processible fluororesin having a predetermined MFR to ensure the strength of a whole injection molded article is used.

Figure 2:
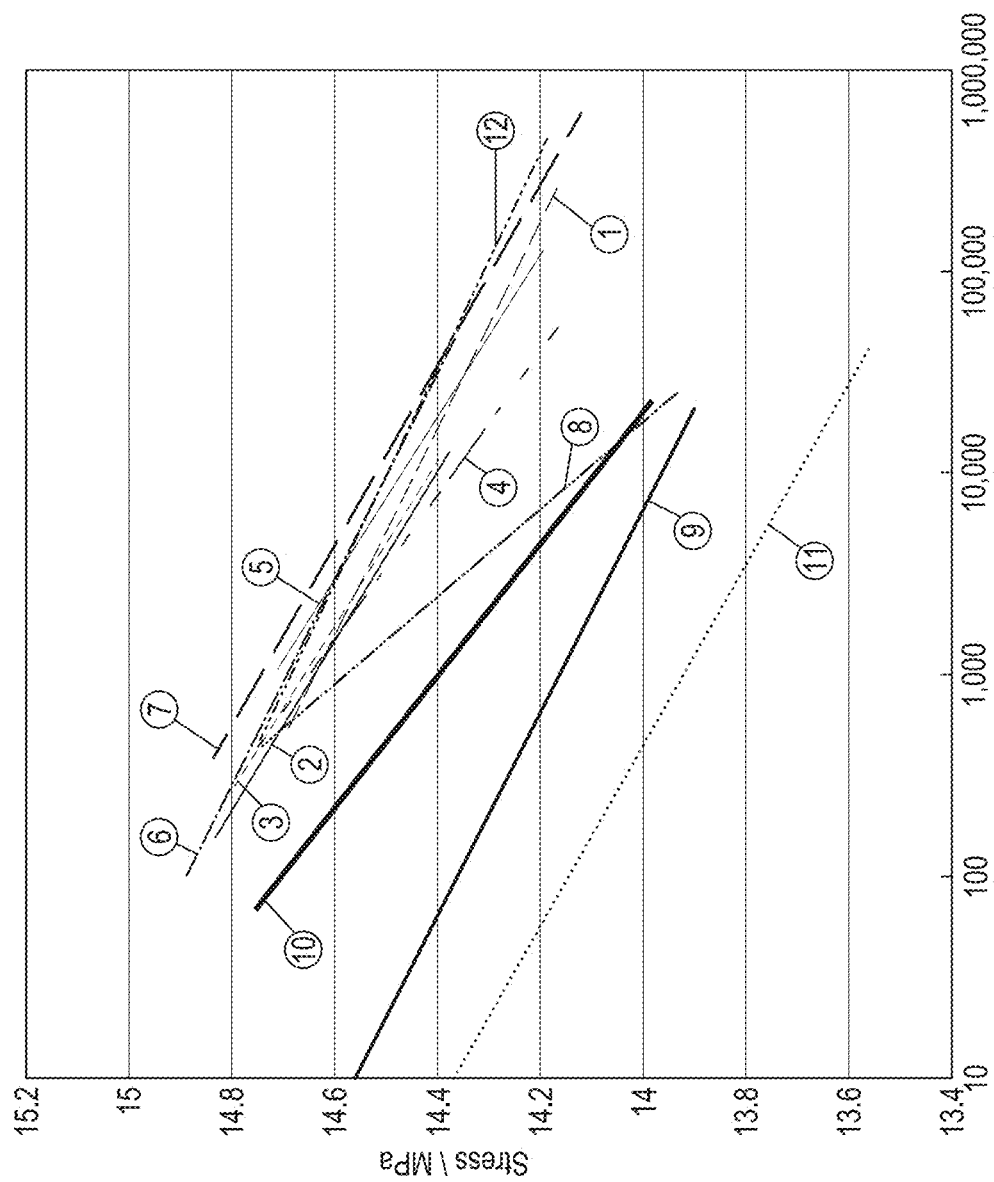
FIG. 2 is a stress life (S-N) plot showing the results of the tensile fatigue test.
Figure 2:
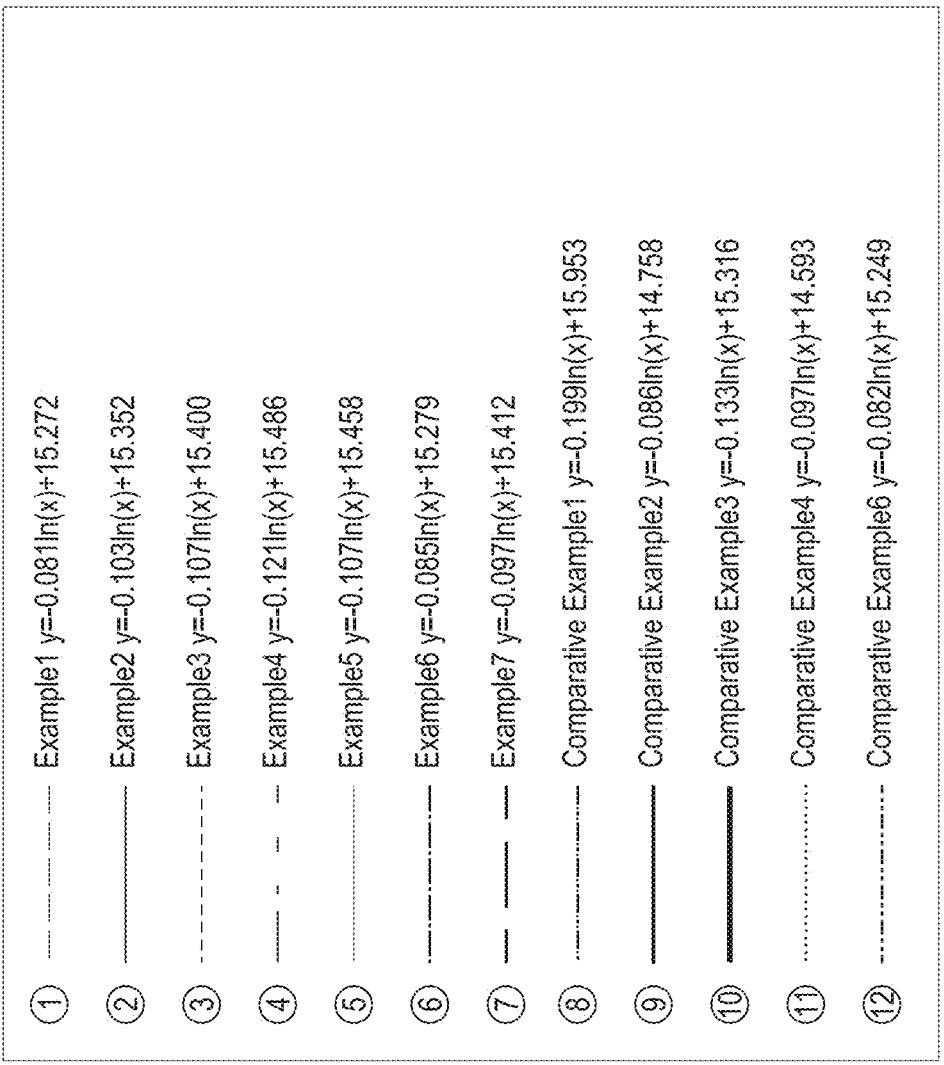

In one embodiment, for the present melt processible fluororesin composition, a Y value of greater than 14.5 MPa when X is at least 1,000 times and the value of the slope "a" of greater than −0.15 are achieved from a logarithmic approximation equation (1) below:

$$Y = a * \ln(X) + b \quad (1)$$

fitted by the least squares method to an stress life (S-N) plot (see FIG. 2, stress at break (MPa) in the cycle number (time) from 1 to 1,000,000 times is shown in the Y-axis, and a cycle number at the break is shown in the X-axis) obtained as a result of tensile fatigue test by using a predetermined test piece obtained by cutting out a weld line area of an injection molded article, and thus it is understood that the strength of the weld line area is significantly enhanced.

Therefore, the present invention further includes a melt processible fluororesin composition, wherein:
i) said composition is fabricated in accordance with ASTM D-2116 into a micro dumbbell-shaped test piece, by injection-molding said melt processible fluororesin composition at an injection pressure and holding pressure of 50 MPa to form a molded sheet having a weld line and a thickness of 1.9±0.5 mm, and cutting from said molded sheet said micro dumbbell-shaped test piece including said weld line,
ii) said micro dumbbell-shaped test piece is subjected to a tensile fatigue test performed under conditions: distance between supports of 22 mm, tensile test speed of 200 mm/min, 23° C., sinusoidal wave, and stress ratio of 0.1, to generate tensile fatigue test results,
iii) said tensile fatigue test results are plotted in a plot of stress at break in MPa on the Y axis versus cycle number in logarithmic scale on the X axis, and
iv) the equation $Y = a * \ln(X) + b$ is fitted to said tensile fatigue test results by the least squares method,
wherein when X is at least 1,000, a Y value of greater than 14.5 MPa and a value of the slope (a) of greater than −0.15 are obtained.

Therefore, it is understood that the injection molded article of an embodiment of the present invention obtained from the present melt processible fluororesin composition achieves a high strength of the weld line area and excellent durability and solvent resistance. Furthermore, as described above, excellent strength of the whole injection molded article across the volume of the article is achieved.

The injection molded article of the present invention is not limited; however, an injection molded article that has a complex shape, such as a joint or a hollow container, and that cannot avoid formation of a weld line area is preferable. In one embodiment the injection molded article is a tube, a pipe, or the like in which a weld line area is not necessarily formed, but even so the present melt processible fluororesin composition is desirably used from the perspectives of excellent durability and excellent solvent resistance.

EXAMPLES

The present invention is described below in further detail by presenting examples and comparative examples, but the present invention is not intended to be limited to these examples.

(1) Melt Flow Rate (MFR)

Using a melt indexer equipped with a corrosion-resistant cylinder, a die, and a piston in accordance with ASTM D 1238 (available from Toyo Seiki Seisaku-sho, Ltd.), after 5 g of a sample was loaded into a cylinder maintained at 372±1° C. and held for 5 minutes, the sample was extruded through a die orifice under a load of 5 kg (piston and weight), and the extrusion rate of the molten material at this time (g/10 min) was determined as the MFR.

(2) Comonomer Content

After a sample was compressed at 350° C. and cooled with water, a film having a thickness of approximately 50μ was obtained, and the comonomer content was determined from an infrared absorption spectrum (nitrogen atmosphere) of this film in accordance with the method described in U.S. Pat. No. 5,760,151 B.

(3) Melting Point (Tm)

A differential scanning calorimeter (Pyris 1 DSC, available from PerkinElmer Inc.) was used. 10 mg of sample powder was weighed and charged in an aluminum pan, crimped, and then stored in a main body of the DSC, and the temperature was increased from 150° C. to 360° C. at 10° C./min. The melting peak temperature (Tm) was determined from the obtained melting curve.

(4) Raw Material

PFA (1): PFA pellet (tetrafluoroethylene/perfluoro(propyl vinyl ether) copolymer; comonomer content: 2.1 mol %; MFR: 65.1 g/10 min; melting point: 302° C.; fluorinated to contain less than 6 unstable terminal groups (—$CH_2OH$ terminal group, —$CONH_2$ terminal group, —COF terminal group) per $10^6$ carbons).

PFA (2): PFA pellet (tetrafluoroethylene/perfluoro(propyl vinyl ether) copolymer; comonomer content: 1.9 mol %; MFR: 30.4 g/10 min; melting point: 306° C.; fluorinated to contain less than 6 unstable terminal groups (—$CH_2OH$ terminal group, —$CONH_2$ terminal group, —COF terminal group) per $10^6$ carbons).

PFA (3): PFA pellet (tetrafluoroethylene/perfluoro(propyl vinyl ether) copolymer; comonomer content: 2.1 mol %; MFR: 15 g/10 min; melting point: 310° C.; fluorinated to contain less than 6 unstable terminal groups (—$CH_2OH$ terminal group, —$CONH_2$ terminal group, —COF terminal group) per $10^6$ carbons).

PFA (4): PFA pellet (tetrafluoroethylene/perfluoro(propyl vinyl ether) copolymer; comonomer content: 1.4 mol %; MFR: 15 g/10 min; melting point: 308° C.; fluorinated to contain less than 6 unstable terminal groups (—$CH_2OH$ terminal group, —$CONH_2$ terminal group, —COF terminal group) per $10^6$ carbons).

PFA (5): PFA pellet (tetrafluoroethylene/perfluoro(propyl vinyl ether) copolymer; comonomer content: 1.3 mol %; MFR: 2 g/10 min; melting point: 310° C.; fluorinated to contain less than 6 unstable terminal groups (—$CH_2OH$ terminal group, —$CONH_2$ terminal group, —COF terminal group) per $10^6$ carbons).

PFA (6): In accordance with conventionally known methods (e.g. those described in JP 2003-231722 A, JP 2003-213196 A, JP 2004-507571 A, and the like), a PFA aqueous dispersion having a core-shell structure, in which the core of the PFA primary particle had the same structure as the core of the PFA (3) (comonomer content and MFR), the shell of the PFA primary particle had the same structure as the shell of the PFA (1) (comonomer content and MFR), and the ratio of core:shell was 50:50 wt. % was obtained by stepwise emulsion polymerization.

To the obtained PFA dispersion, 0.05 wt. % of a high molecular weight PTFE aqueous dispersion (melting point:

338° C.; MFR: 0 g/10 min; crystal melting heat quantity: 32.1 J/g) obtained by emulsion polymerization was added and agitated/aggregated to obtain an aggregation, and then the aggregation was dried at 292° C. for 12 hours. This PFA powder was extruded while the resin temperature was maintained at 360° C. by using a twin-screw extruder and pelletized. (MFR: 28.5 g/10 min)

PFA (7): The pellet of the PFA (6) was subjected to fluorine gas treatment in accordance with the method described in JP 62-104822 A to stabilize the terminal group (fluorination).

(MFR: 30.3 g/10 min; less than 6 unstable terminal groups (—CH$_2$OH terminal group, —CONH$_2$ terminal group, —COF terminal group) per 10$^6$ carbons)

(5) Preparation of High Molecular Weight PTFE Master Batch

The PFA aqueous dispersion obtained by emulsion polymerization (tetrafluoroethylene/perfluoro(propyl vinyl ether copolymer); MFR: 75.0 g/10 min; melting point: 310° C.)) and the high molecular weight PTFE aqueous dispersion obtained by emulsion polymerization (melting point: 338° C.; MFR: 0 g/10 min; crystal melting heat quantity: 32.1 J/g) were mixed so that the PFA was 98 wt. % and the PTFE was 2 wt. % on a polymer solids basis, and coagulated/dried to obtain a PFA/PTFE mixture powder (co-coagulation method). The obtained powder was extrusion-molded by using a single screw extrusion molding machine with 20 mm diameter, and pelletized by using a strand cutter.

The obtained pellet was subjected to fluorine gas treatment in accordance with the method described in JP 62-104822 A to stabilize the terminal group (fluorination).

Example 1

Using the PFA (1) as the high MFR melt processable fluororesin and using the PFA (2) as the low MFR melt processable fluororesin, the pellets were blended in a manner that the ratio was PFA (1):PFA (2):high molecular weight PTFE master batch=77.5:20:2.5 (wt. %) and subjected to melt-kneading extrusion to pelletize, by using a twin-screw extruder with a cylinder temperature of 360° C. and by placing a kneading block in the screw. The obtained pellet was dried at 150° C. for 5 hours. The MFR of this melt processable fluororesin composition was 28.4 g/10 min. The obtained pellet was substantially cylindrical form with the diameter of approximately 3 mm and the length of approximately 3 mm.

From the obtained pellet of the melt processable fluororesin composition, an injection molded article having a weld line area at the center and having the width of 28 mm, the length of 48 mm, and the thickness of 1.9±0.5 mm, was produced by using the NEX180-36E injection molding machine (L/D=24; screw diameter: 45 mm), available from Nissei Plastic Industrial Co., Ltd., at the resin temperature of 380° C., the injection pressure and holding pressure of 50 MPa, the injection rate of 10 mm/sec, and the mold temperature of 180° C. A micro dumbbell shape illustrated in FIG. 1 with dimensions (in mm) as marked on FIG. 1 was punched out from the portion, in which the weld line of this injection molded article was contained, and used as a test piece for the tensile fatigue test.

Thereafter, the obtained test piece was fixed by grippers of the tensile fatigue tester, available from MYS-TESTER Company Limited, so that the distance between supports was 22 mm, and was repeatedly subjected to tensile fatigue in the following test conditions: tensile test speed of 200 mm/min, temperature of 23° C., sinusoidal wave, stress control, and stress ratio of 0.1.

The measurement was performed at a discretionary chosen stress, and the number of cycles until break was recorded. The stress was discretionary set so that the cycle number at break was approximately 1, 10, 100, 1,000, 10,000, 100,000, and 1,000,000 times.

A stress life (S-N) plot was created in which each of the measured stresses was plotted on the Y-axis, the cycle number at the break was plotted on the X-axis (in log scale), and the logarithmic approximation equation expressed by Y=a*ln(X)+b was fitted to the plotted data by the least squares method. The obtained stress life (S-N) plot is shown in FIG. 2.

The stress at break Y when the cycle number at break X was 1,000 times, and the value of slope a were compared to evaluate durability. The evaluation criteria are as described below.

Good: The Y value was greater than 14.5 MPa at the cycle number at break X=1,000 times, and the value of the slope a was greater than −0.15

Poor: The Y value was 14.5 MPa or less at the cycle number at break X=1,000 times, and/or the value of the slope a was −0.15 or less The evaluation results are shown in Table 1.

Example 2

A composition pellet was obtained by using the PFA (3) as the low MFR melt processable fluororesin, and by blending the pellets in a manner that the ratio was PFA (1):PFA (3):high molecular weight PTFE master batch=47.5:50:2.5 (wt. %) and subjecting the mixture to melt-kneading extrusion in the same manner as in Example 1. The MFR of this melt processable fluororesin composition was 32.6 g/10 min. A test piece was produced in the same manner as in Example 1, and the weld strength evaluation was performed by the tensile fatigue test. The obtained S-N plot is shown in FIG. 2. The evaluation results are shown in Table 1.

Example 3

A pellet of a melt processable fluororesin composition was obtained by using the PFA (1) as the high MFR melt processable fluororesin and using the PFA (3) as the low MFR melt processable fluororesin, and by blending the pellets in a manner that the ratio was PFA (1):PFA (3)=50:50 (wt. %) and subjecting the mixture to melt-kneading extrusion in the same manner as in Example 1. The MFR of this melt processable fluororesin composition was 28.0 g/10 min.

A test piece was produced from the pellet of the composition in the same manner as in Example 1, and the weld strength evaluation was performed by the tensile fatigue test. The obtained S-N plot is shown in FIG. 2. The evaluation results are shown in Table 1.

Example 4

A pellet of a melt processable fluororesin composition was obtained by using the PFA (1) as the high MFR melt processable fluororesin and using the PFA (3) as the low MFR melt processable fluororesin, and by blending the pellets in a manner that the ratio was PFA (1):PFA (3)=20:80 (wt. %) and subjecting the mixture to melt-kneading extrusion in the same manner as in Example 1. The MFR of this melt processable fluororesin composition was 19.8 g/10 min.

A test piece was produced from the pellet of the composition in the same manner as in Example 1, and the weld strength evaluation was performed by the tensile fatigue test. The obtained S-N plot is shown in FIG. 2. The evaluation results are shown in Table 1.

Example 5

A pellet of a melt processible fluororesin composition was obtained by using the PFA (1) as the high MFR melt processible fluororesin and using the PFA (3) as the low MFR melt processible fluororesin, and by blending the pellets in a manner that the ratio was PFA (1):PFA (3)=80:20 (wt. %) and subjecting the mixture to melt-kneading extrusion in the same manner as in Example 1. The MFR of this melt processible fluororesin composition was 46.6 g/10 min.

A test piece was produced from the pellet of the composition in the same manner as in Example 1, and the weld strength evaluation was performed by the tensile fatigue test. The obtained S-N plot is shown in FIG. 2. The evaluation results are shown in Table 1.

Example 6

A test piece was produced in the same manner as in Example 1 except for using the pellet of the PFA (6) as the melt processible fluororesin composition, and the weld strength evaluation was performed by the tensile fatigue test. The obtained S-N plot is shown in FIG. 2. The evaluation results are shown in Table 1.

Example 7

A test piece was produced in the same manner as in Example 1 by using the pellet of the PFA (7) as the melt processible fluororesin composition, and the weld strength evaluation was performed by the tensile fatigue test. The obtained S-N plot is shown in FIG. 2. The evaluation results are shown in Table 1.

Comparative Example 1

A test piece was produced in the same manner as in Example 1 except for using only the pellet of the PFA (1), and the weld strength evaluation was performed by the tensile fatigue test. The obtained S-N plot is shown in FIG. 2. The evaluation results are shown in Table 1.

Comparative Example 2

A test piece was produced in the same manner as in Example 1 except for using only the pellet of the PFA (2), and the weld strength evaluation was performed by the tensile fatigue test. The obtained S-N plot is shown in FIG. 2. The evaluation results are shown in Table 1.

Comparative Example 3

A test piece was produced in the same manner as in Example 1 except for using only the pellet of the PFA (3), and the weld strength evaluation was performed by the tensile fatigue test. The obtained S-N plot is shown in FIG. 2. The evaluation results are shown in Table 1.

Comparative Example 4

A test piece was produced in the same manner as in Example 1 except for using only the pellet of the PFA (4), and the weld strength evaluation was performed by the tensile fatigue test. The obtained S-N plot is shown in FIG. 2. The evaluation results are shown in Table 1.

Comparative Example 5

A pellet of a melt processible fluororesin composition was obtained by using the PFA (1) as the high MFR melt processible fluororesin and using the PFA (5) as the low MFR melt processible fluororesin, and by blending the pellets in a manner that the ratio was PFA (1):PFA (5)=50:50 (wt. %) and subjecting the mixture to melt-kneading extrusion in the same manner as in Example 1. The MFR of this melt processible fluororesin composition was 7.6 g/10 min.

It was attempted to produce a test piece in the same manner as in Example 1 from the pellet of the composition; however, the mold could not be charged with the resin (short shot), and it was not possible to produce a test piece.

Comparative Example 6

A pellet of a melt processible fluororesin composition was obtained by using the PFA (1) as the high MFR melt processible fluororesin and using the PFA (5) as the low MFR melt processible fluororesin, and by blending the pellets in a manner that the ratio was PFA (1):PFA (5)=80:20 (wt. %) and subjecting the mixture to melt-kneading extrusion in the same manner as in Example 1. The MFR of this melt processible fluororesin composition was 24.0 g/10 min.

A test piece was produced from the pellet of the composition in the same manner as in Example 1, and the weld strength evaluation was performed by the tensile fatigue test. The obtained S-N plot is shown in FIG. 2. The evaluation results are shown in Table 1.

Release Evaluation (Presence/Absence of Surface Roughness)

Figure 3A:
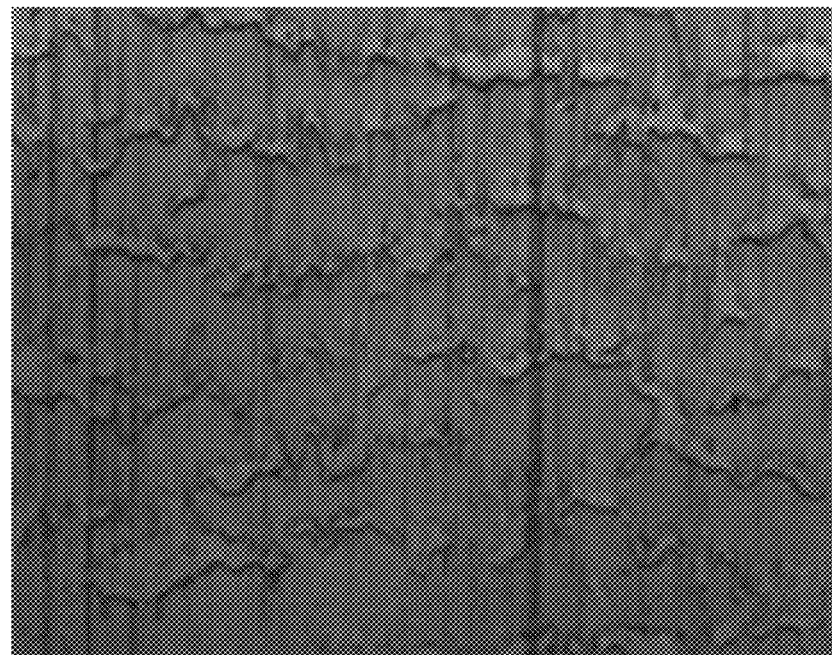
FIGS. 3A and 3B are photographs showing the surface conditions of the injection molded articles obtained in Example 2 and Example 3.
Figure 3B:
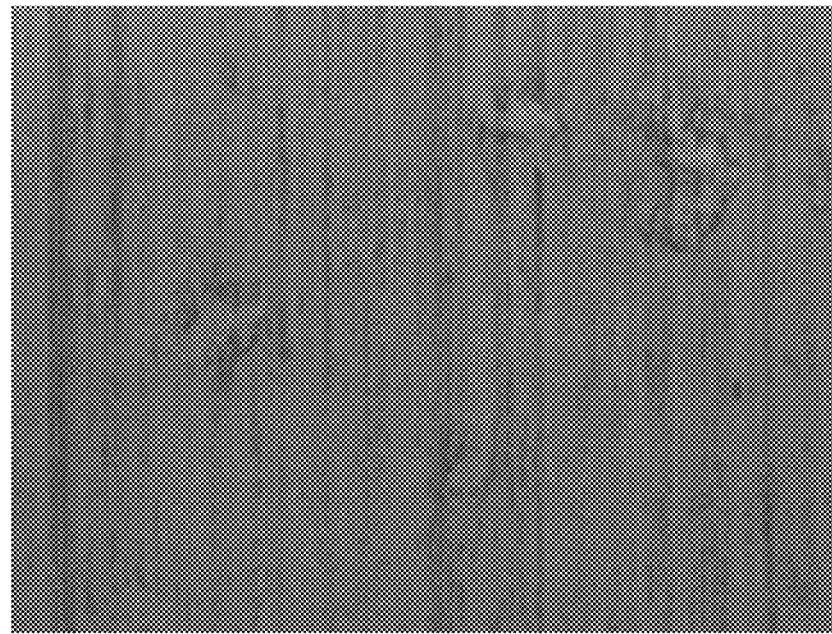

Inner surfaces of parts, where core pins were drawn out, of the pellets of the melt processible fluororesin compositions of Example 2 and Example 3 were observed by using a laser microscope (confocal microscope OPTELICS C130, available from Lasertec Corporation) when a T joint-shaped molded article was injection molded by using the NEX180-36E injection molding machine (available from Nissei Plastic Industrial Co., Ltd.) at the resin temperature of 360° C., the injection pressure and holding pressure of 50 MPa, the injection rate of 6 mm/sec, and the mold temperature of 160° C. The results are shown in FIGS. 3A and 3B (FIG. 3A is Example 3 and FIG. 3B is Example 2).

High Speed Injection Molding Properties Test

For melt processible fluororesin composition pellets of Example 2 and Comparative Example 6, a melt-extruded strand was obtained by using a capillary rheometer (Capirograph 1D, Toyo Seiki Seisaku-sho, Ltd.) at the cylinder temperature of 380° C., the orifice diameter of 2 mm, L/D=10, and the piston speed of 100 mm/min (corresponding to a shear rate of 152 $sec^{-1}$) and 150 mm/min (corresponding to a shear rate of 228 $sec^{-1}$).

Figure 4:
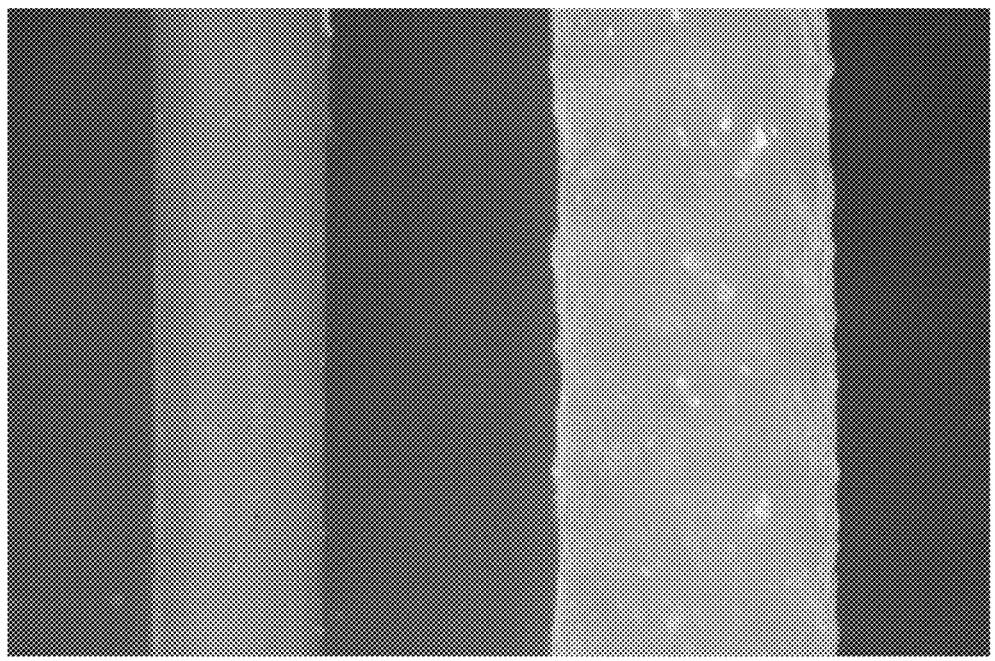
FIG. 4 is a photograph of the appearance of a strand that was melt-extruded at a shear rate of 228 sec$^{-1}$ by using melt processable fluororesin composition pellets obtained in Example 2 (strand on left hand side of FIG. 4) and Comparative Example 6 (strand on right hand side of FIG. 4).

The appearance of the strand obtained from the pellet of Example 2 was smooth (FIG. 4, strand on left hand side of photo); however, the appearance of the strand obtained from the pellet of Comparative Example 6 was uneven due to its surface roughness (FIG. 4, strand on right hand side of photo). The height of the roughness on the strand surface was measured at the magnification of 200 times by using a laser microscope (confocal microscope OPTELICS C130, available from Lasertec Corporation; cut-off value when a profile curve was created from the profile curve of the actual surface: 0.008). The results are shown in Table 2.

TABLE 1

| | High MFR resin | | Low MFR resin | | High molecular weight PTFE master batch (wt. %) | High molecular weight PTFE content in composition | Composition MFR (g/10 min) | Tensile Fatigue Test | |
|---|---|---|---|---|---|---|---|---|---|
| | MFR (g/10 min) | Composition ratio (wt. %) | MFR (g/10 min) | Composition ratio (wt. %) | | | | Evaluation | Where Test Piece Broke |
| Example 1 | 65.1 | 77.5% | 30.4 | 20% | 2.5% | 0.05% | 28.4 | Good | Weld area |
| Example 2 | 65.1 | 47.5% | 15.0 | 50% | 2.5% | 0.05% | 32.6 | Good | Weld area |
| Example 3 | 65.1 | 50% | 15.0 | 50% | | | 28.0 | Good | Weld area |
| Example 4 | 65.1 | 20% | 15.0 | 80% | | | 19.8 | Good | Weld area |
| Example 5 | 65.1 | 80% | 15.0 | 20% | | | 46.6 | Good | Not weld area |
| Example 6 | (Measurement was not possible) | | (Measurement was not possible) | | | 0.05% | 28.5 | Good | Weld area |
| Example 7 | (Measurement was not possible) | | (Measurement was not possible) | | | 0.05% | 30.3 | Good | Weld area |
| Comparative Example 1 | 65.1 | 100% | | | | | 65.1 | Poor | Not weld area |
| Comparative Example 2 | 30.4 | 100% | | | | | 30.4 | Poor | Weld area |
| Comparative Example 3 | 15 | 100% | | | | | 15.0 | Poor | Weld area |
| Comparative Example 4 | 15 | 100% | | | | | 15.0 | Poor | Weld area |
| Comparative Example 5 | 65.1 | 50% | 2 | 50% | | | 7.6 | —(1) | — |
| Comparative Example 6 | 65.1 | 80% | 2 | 20% | | | 24.0 | Good | Weld area |

(1) Production of test piece was not possible due to short shot (mold was not sufficiently filled)

TABLE 2

| | Shear rate 152 sec$^{-1}$ | | Shear rate 228 sec$^{-1}$ | |
|---|---|---|---|---|
| | Strand appearance | Maximum height of rough part | Strand appearance | Maximum height of rough part |
| Example 2 | Favorable | 5 μm | Favorable | 5 μm |
| Comparative Example 6 | Opaque due to surface roughness | 12 μm | Opaque due to surface roughness | 35 μm |

INDUSTRIAL APPLICABILITY

The present melt processable fluororesin compositions afford excellent injection molding performance, and when an article comprising the present melt processable fluororesin compositions having a complex shape that cannot avoid formation of a weld line is molded by injection molding, the strength of the formed weld line area is significantly enhanced, and excellent chemical resistance and durability are achieved. Therefore, the present melt processable fluororesin compositions can be suitably used to form injection molded articles having complex shapes, such as joints, containers for chemicals, valve bodies, and wafer carriers, as well as tubes or pipes for transporting chemicals and/or ultra pure water, and the like.

What is claimed is:
1. A melt processable fluororesin composition comprising: a mixture of two or more types of melt processable fluororesins having melt flow rates that are different from each other, and from 0.01 to 1 wt. % of a high molecular weight polytetrafluoroethylene based on the total weight of melt processable fluororesins and polytetrafluoroethylene;
one of the two or more types of melt processable fluororesins being a high melt flow rate melt processable fluororesin having a melt flow rate of 35 g/10 min or greater, and another being a low melt flow rate melt processable fluororesin having a melt flow rate of 10 g/10 min or greater but less than 35 g/10 min, and wherein
the ratio of the melt flow rate (MFRa) of the high melt flow rate melt processable fluororesin to the melt flow rate (MFRb) of the low melt flow rate melt processable fluororesin (MFRa/MFRb) is greater than 1 but less than or equal to 10, and wherein
the high melt flow rate melt processable fluororesin and the low melt flow rate melt processable fluororesin are tetrafluoroethylene/perfluoro(alkyl vinyl ether) copolymers (PFA).
2. The melt processable fluororesin composition according to claim 1, wherein said melt processable fluororesin composition has a melt flow rate of from 10 to 100 g/10 min.
3. The melt processable fluororesin composition according to claim 1, wherein the content of the high melt flow rate melt processable fluororesin is from 5 to 95 wt. % of the total amount of the melt processable fluororesins.
4. The melt processable fluororesin composition according to claim 1, wherein the content of perfluoro(alkyl vinyl ether) in the high melt flow rate tetrafluoroethylene/perfluoro(alkyl vinyl ether) copolymer is from 1.5 to 5.0 mol %, and the content of perfluoro(alkyl vinyl ether) in the low melt flow rate tetrafluoroethylene/perfluoro(alkyl vinyl ether) copolymer is from 1.0 to 4.0 mol %.
5. The melt processable fluororesin composition according to claim 1, wherein at least one of said high melt flow rate melt processible fluororesin and said low melt flow rate melt processible fluororesin are fluorinated so as to reduce the number of fluororesin chain unstable endgroups and replace such endgroups with —$CF_3$ endgroups.

6. The melt processible fluororesin composition according to claim 1, wherein,
   i) said composition is fabricated in accordance with ASTM D-2116 into a micro dumbbell-shaped test piece, by injection-molding said melt processible fluororesin composition at an injection pressure and holding pressure of 50 MPa to form a molded sheet having a weld line and a thickness of 1.9±0.5 mm, and cutting from said molded sheet said micro dumbbell-shaped test piece including said weld line,
   ii) said micro dumbbell-shaped test piece is subjected to a tensile fatigue test performed under conditions: distance between supports of 22 mm, tensile test speed of 200 mm/min, 23° C., sinusoidal wave, and stress ratio of 0.1, to generate tensile fatigue test results,
   iii) said tensile fatigue test results are plotted in a plot of stress at break in MPa on the Y axis versus cycle number in logarithmic scale on the X axis, and
   iv) the equation $Y=a*\ln(X)+b$ is fitted to said tensile fatigue test results by the least squares method,
   wherein when X is at least 1,000, a Y value of greater than 14.5 MPa and a value of the slope (a) of greater than −0.15 are obtained.

7. An injection molded article formed by subjecting the melt processible fluororesin composition described in claim 1 to injection molding.

8. The injection molded article of claim 7, wherein said article contains at least one weld line.

9. The melt processible fluororesin composition according to claim 1, wherein the tetrafluoroethylene/perfluoro(alkyl vinyl ether) copolymers consist essentially of tetrafluoroethylene and perfluoro(alkyl vinyl ether).

10. The melt processible fluororesin composition according to claim 1, wherein the tetrafluoroethylene/perfluoro(alkyl vinyl ether) copolymers consist of tetrafluoroethylene and perfluoro(alkyl vinyl ether).

11. The melt processible fluororesin composition according to claim 1, wherein the low melt flow rate melt processible fluororesin has a melt flow rate of 12 g/10 min or greater but less than 32 g/10 min.

12. The melt processible fluororesin composition according to claim 1, wherein the melt processible fluororesin composition is injection-molded with a weld line.

* * * * *